Dec. 23, 1941.　　　R. K. JEFFREY　　　2,267,656
HYDRAULIC BRAKE SYSTEM
Filed Aug. 4, 1939　　　8 Sheets-Sheet 1

INVENTOR:
ROBERT K. JEFFREY,
BY
Chas. M. Nissen,
ATTY.

Dec. 23, 1941.  R. K. JEFFREY  2,267,656
HYDRAULIC BRAKE SYSTEM
Filed Aug. 4, 1939  8 Sheets-Sheet 2

Dec. 23, 1941.    R. K. JEFFREY    2,267,656
HYDRAULIC BRAKE SYSTEM
Filed Aug. 4, 1939    8 Sheets-Sheet 3

INVENTOR:
ROBERT K. JEFFREY,
BY
Chas. M. Nissen,
ATTY.

Dec. 23, 1941.    R. K. JEFFREY    2,267,656
HYDRAULIC BRAKE SYSTEM
Filed Aug. 4, 1939    8 Sheets-Sheet 4

INVENTOR:
ROBERT K. JEFFREY,
BY
Chas. M. Nissen,
ATTY.

Dec. 23, 1941.          R. K. JEFFREY          2,267,656
HYDRAULIC BRAKE SYSTEM
Filed Aug. 4, 1939          8 Sheets-Sheet 5

INVENTOR:
ROBERT K. JEFFREY,
BY
Chas. M. Niesen,
ATTY.

Dec. 23, 1941.　　　R. K. JEFFREY　　　2,267,656
HYDRAULIC BRAKE SYSTEM
Filed Aug. 4, 1939　　　8 Sheets-Sheet 6

INVENTOR:
ROBERT K. JEFFREY,
By Chas. M. Nissen,
ATT'Y.

Dec. 23, 1941.   R. K. JEFFREY   2,267,656
HYDRAULIC BRAKE SYSTEM
Filed Aug. 4, 1939   8 Sheets-Sheet 8

INVENTOR:
ROBERT K. JEFFREY,
BY
Chas. M. Nissen,
ATTY.

Patented Dec. 23, 1941

2,267,656

UNITED STATES PATENT OFFICE 2,267,656

HYDRAULIC BRAKE SYSTEM

Robert K. Jeffrey, Columbus, Ohio, assignor to The Jeffrey Manufacturing Company, a corporation of Ohio Application August 4, 1939, Serial No. 288,387

19 Claims. (Cl. 303—10)

This invention relates to a hydraulic brake system particularly adapted for controlling heavy vehicles, such as mine locomotives, trucks, tractors and other similar devices.

An object of the invention is to provide a hydraulic brake system which is particularly adapted to control the brakes of vehicles of the above mentioned type and to regulate the braking action at any desired variable value as circumstances require.

A further object of the invention is to provide a hydraulic braking system in which hydraulic fluid under pressure is accumulated and available even though the pump of the hydraulic system has stopped.

Still another object of the invention is to provide a hydraulic system in which the hydraulic fluid is maintained at a substantially constant pressure at the control valve regardless of the pressure of the hydraulic fluid delivered from the pump.

Another object of the invention is to provide a hydraulic braking system in which the pressure of the hydraulic fluid supplied to the brake actuating mechanism is readily controllable at any desired pressure.

A further object of the invention is to provide a hydraulic braking system which may be applied to a multiple locomotive mine train and be controlled from any one of a plurality of the locomotives while at the same time requiring a minimum of space.

Still another object of the invention is to provide mechanism to economize in the use of hydraulic fluid which is under high pressure.

A further object of the invention is to provide an improved hydraulic fluid pressure accumulator.

Still another object of the invention is to provide an improved automatic pressure reducing valve for a hydraulic system.

A further object of the invention is to provide a novel high pressure fluid economizer.

Another object of the invention is to provide an improved hydraulic control valve which is normally balanced and also one which varies the pressure of the hydraulic fluid flowing from it at any predetermined value according to the valve setting.

Still another object of the invention is to provide a wheel driven pump to insure hydraulic pressure during motion of the vehicle.

Other objects of the invention will appear hereinafter, the novel features and combinations being set forth in the appended claims.

In the accompanying drawings.

Figure 1:
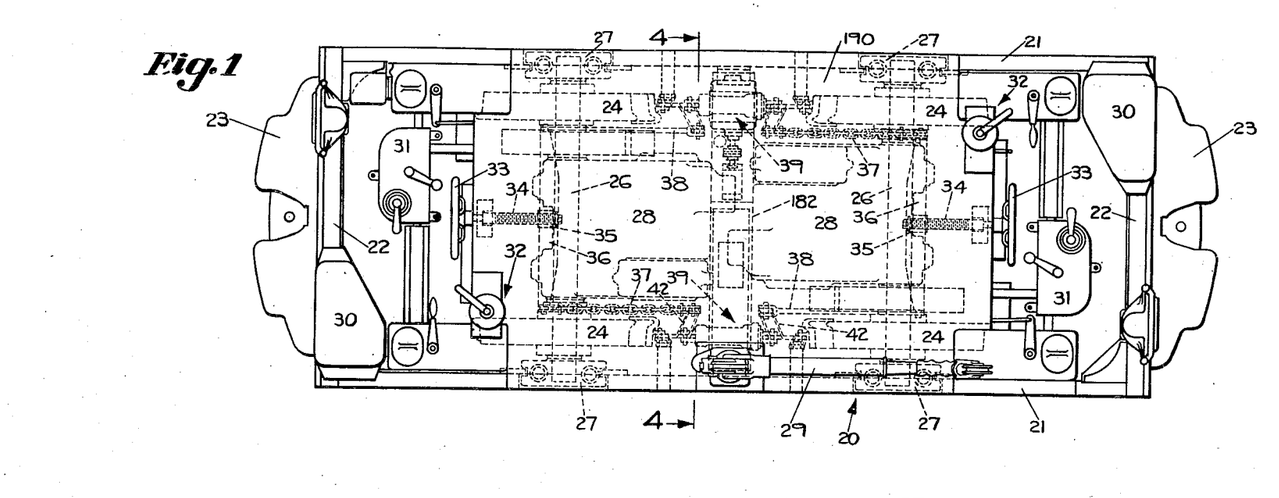
Fig. 1 is a plan view of a mine locomotive including the hydraulic braking system of my invention.
Figure 2:
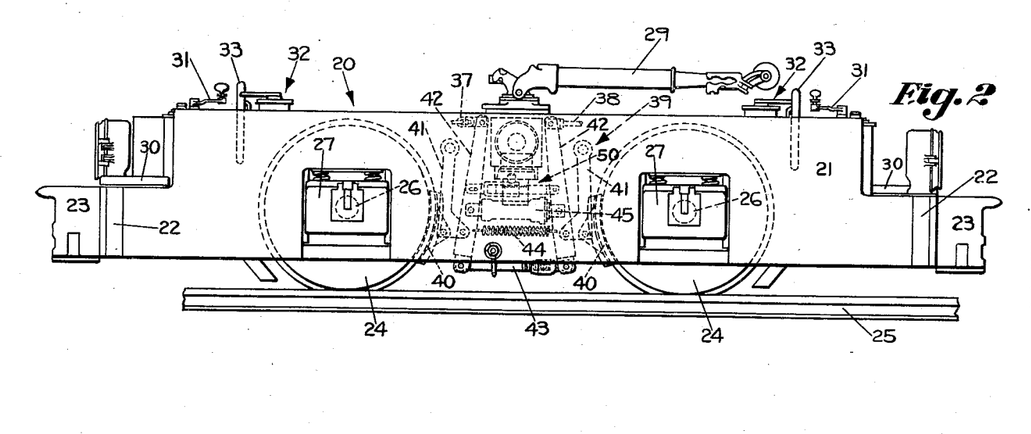
Fig. 2 is a side elevational view of the mining machine of Fig. 1.

Referring to Figs. 1 and 2 of the drawings, there is illustrated a mine locomotive incorporating the hydraulic brake system of my invention, and while the system is susceptible to more general application as for example, in connection with trucks, tractors, or any other similar heavy equipment, it is particularly useful in combination with a mine locomotive because of the fact that these mine locomotives are quite limited in size, particularly in their height, and it is essential that the brake mechanism require a minimum of space while at the same time affording very positive and efficient action. It is also very useful with tandem locomotive units.

As seen by reference to Figs. 1 and 2 of the drawings, the mine locomotive comprises a main frame 20 formed of a pair of spaced side plates 21, 21 the ends of which are connected by cross-plates 22, 22. Each cross-plate 22 carries a combined bumper and coupler 23 which is preferably in the form of a heavy casting which is bolted to adjacent cross-plate 22.

The main frame 20 is supported upon four wheels 24 adapted to ride along rails 25 of a mine track. Wheels 24 are rigidly attached to axles 26, 26 which are journaled in spring mounted journal boxes 27, 27. The axles 26, 26 are driven by electric motors 28, 28 which derive power from a mine trolley 29.

It is to be noted that the locomotive is provided with dual controls and that it may be controlled from either end; and to this end there is a seat 30 for the operator at each end adjacent which is an electrical motor controller 31, a control valve 32 for the power operated hydraulic brake system and a hand wheel 33 for mechanically operating the braking system.

It is to be noted that each hand wheel 33 is mounted for free rotation and carries a feed screw 34 which feeds into a nut 35 carried on a laterally extending equalizer bar 36 one end of which is connected to a brake operating chain 37, the other end of which is connected to a brake operating rod 38. The chain 37 and rod 38 for the hand wheels at opposite ends of the locomotive are on reverse sides thereof, as clearly illustrated in Fig. 1 of the drawings.

On each side of the locomotive and cooperating with both wheels 24 on a single side is a braking mechanism designated generally by the reference character 39. Said braking mechanism 39 comprises brake shoes 40, 40 one associated with each of the wheels 24, each of which shoes 40 is pivotally mounted upon a bell crank lever 41 which is pivoted at its upper end to a side plate 21. Also pivotally attached to each bell crank lever 41 is an operating lever 42, said operating levers 42 being connected together at their bottoms by an adjustable connecting link 43, the opposite ends of which are pivotally attached to the bottoms of said levers 42. Also connected between the two levers 42 is a coil spring 44 which urges the tops of levers 42 towards each other about their pivotal connections to said link 43. It is evident that this coil spring 44 therefore biases the brake shoes 40 to their released or non-operating positions.

Directly above the coil spring 44 and connected between the two levers 42 is a hydraulic piston motor or jack 45 illustrated in detail in Fig. 13 of the drawings, which is adapted to be expanded or contracted to apply or release the braking mechanism 39 in a manner hereinafter described more completely.

Figure 13:
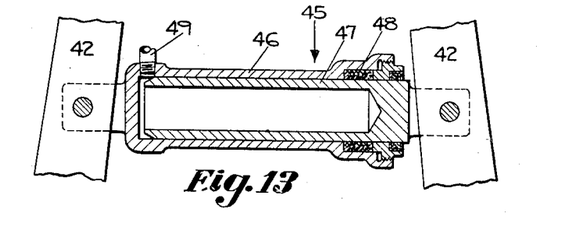
Fig. 13 is an enlarged view of a brake actuating hydraulic jack.
Figure 14:
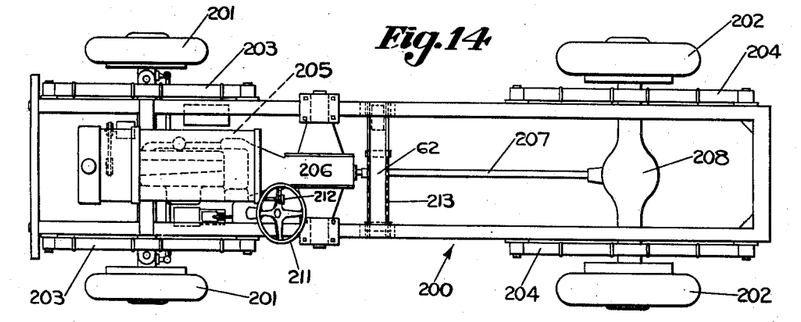
Fig. 14 is a plan view of a truck chassis incorporating a modified form of hydraulic brake system comprising my invention.
Figure 15:
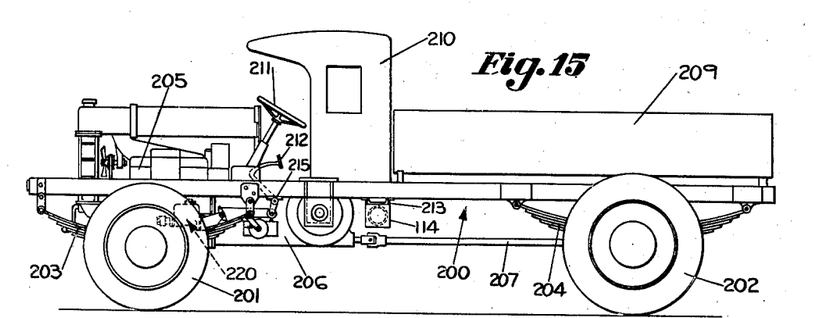
Fig. 15 is a side elevational view of the truck the chassis of which is illustrated in Fig. 14.

Referring to Fig. 13 of the drawings, it may be pointed out that said hydraulic piston motor or jack 45 comprises a cylinder 46 pivotally attached to the left-hand lever 42, as viewed in said Fig. 13, within which is a sleeve type hollow piston 47 which is pivotally attached to the other lever 42. A fluid-tight packing box 48 is provided at the head end of the cylinder 46 which, of course, provides for ready sliding movement of the piston 47 in the cylinder 46 while at the same time preventing leakage of hydraulic fluid or oil therefrom.

As clearly illustrated in Fig. 13 of the drawings, the hydraulic conduit or feed pipe 49 feeds the bottom of the cylinder 46 and by the feeding of hydraulic fluid under pressure through said feed pipe 49 and the releasing of the hydraulic fluid under pressure therefrom the hydraulic piston motor or jack 45 may be expanded to apply the braking mechanism 39 or released to effect a releasing thereof.

Figures 8, 9, 10, 11, 12:
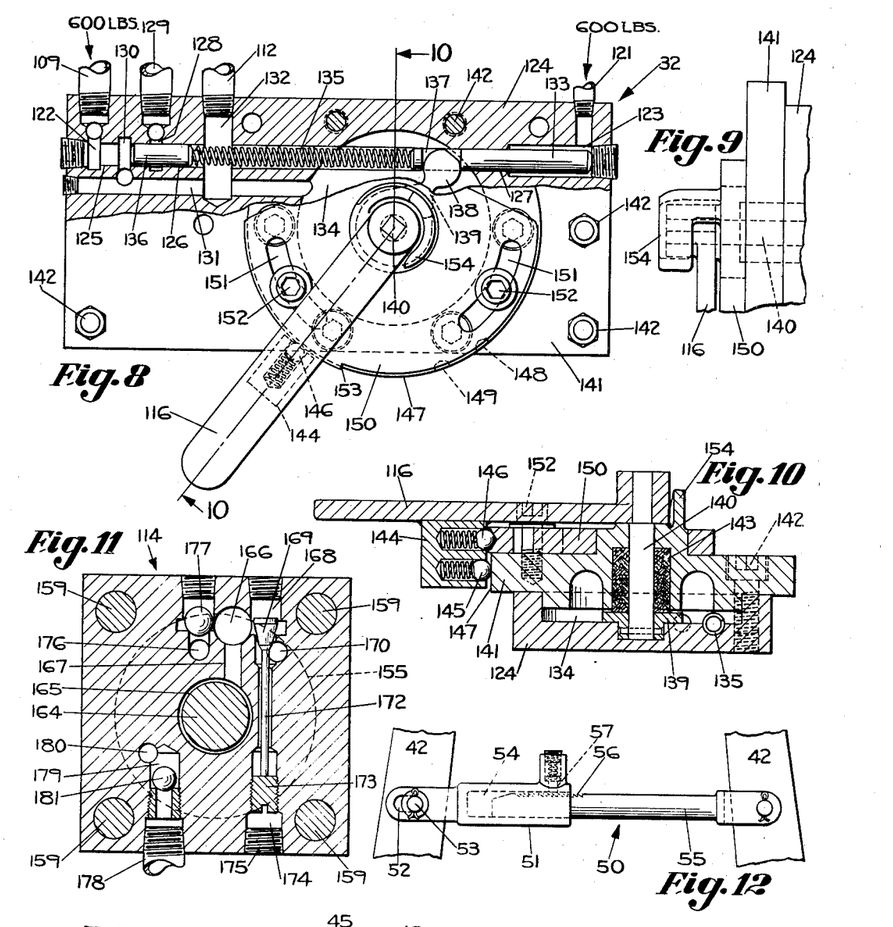
Fig. 8 is a combined plan and sectional view of the control valve.
Fig. 9 is an enlarged end view showing a detail of the control valve of Fig. 8.
Fig. 10 is a sectional view taken on the line 10—10 of Fig. 8 looking in the direction of the arrows.
Fig. 11 is a sectional view taken on the line 11—11 of Fig. 7 looking in the direction of the arrows.
Fig. 12 is an enlarged view of automatic brake adjusting mechanism.

Directly above the hydraulic piston motor or jack 45 is an automatic brake adjusting mechanism 50 illustrated in detail in Fig. 12 of the drawings. Said automatic brake adjusting mechanism 50 comprises a generally cylindrical casting 51 which is pivotally attached to the left-hand lever 42, as viewed in Fig. 12 of the drawings, by a lost motion connection provided by elongated slots one of which is seen at 52 formed in the bifurcated head of the casting 51 which slots 52 cooperate with the pivot pin 53 carrying at opposite ends retaining washers and cotter keys.

Slidable within a central bore 54 in the casting 51 is a cylindrical rod 55 having a bifurcated head which is pivotally attached to the other lever 42. Rod 55 is provided with ratchet teeth 56 which cooperate with a spring-pressed detent 57 carried in a well in the casting 51. It is evident by reference to Fig. 12 of the drawings that the rod 55 may slide freely to the right with respect to the casting 51 with the detent 57 ratcheting over the teeth 56, but movement of said rod 55 toward the left with respect to said casting 51 is prevented.

It is evident from the structure of said brake adjusting mechanism 50 that the two levers 42 may freely move with respect to each other without any relative movement between the casting 51 and the rod 55 to the limits provided by the slots 52. However, any greater movement in an outward direction results in an expansion of the effective length of the brake adjusting mechanism 50 and this insures a relatively fixed amount of slack in the braking mechanism 39.

The upper ends of the two levers 42 are pivotally attached to the aforedescribed chains 37 and rods 38 of the manually operable brake mechanism. That is, each of the braking mechanisms 39 has a chain 37 pivotally attached to the top of one of the levers 42 which acts to accumulate slack when the brakes are released and a rod 38 pivotally attached to the top of the other member 42. Furthermore, as clearly seen by reference to Fig. 1 of the drawings, from each hand wheel 33 there is a chain 37 and a rod 38 leading to a braking mechanism 39.

It is thus evident that the brakes may be applied to the mine locomotive either by operating either of the manually controllable hand wheels 33 which provides for a purely mechanical braking mechanism operable from either end of the locomotive, or by controlling the hydraulic piston motors or jacks 45 associated with each braking mechanism 39, which also may be controlled by control valves 32 from either end of the locomotive.

Whenever a hand wheel 33 is operated to move the bar 36 rearwardly one of the levers 42 on each side of the locomotive is moved to brake applying position by swinging the top thereof with respect to the pivot provided at its bottom by the connecting link 43 which, of course, expands the link mechanism 42, 42 to apply the brakes.

Also, upon the expanding of the two hydraulic piston motors or jacks 45, which are operated together so as to apply the braking mechanism 39 on both sides of the vehicle simultaneously, the levers 42, 42 are expanded or moved away from each other about the pivots at their bottoms to apply the brake mechanisms.

When the hand wheels 33 are operated to the brake releasing position and the hydraulic piston motors or jacks 45 are released, the coil springs 44 associated with the two braking mechanisms 39 will operate to release the braking mechanisms and swing the two levers 42 toward each other at their tops by swinging them about their pivotal axes at their bottoms.

Figures 3, 4:
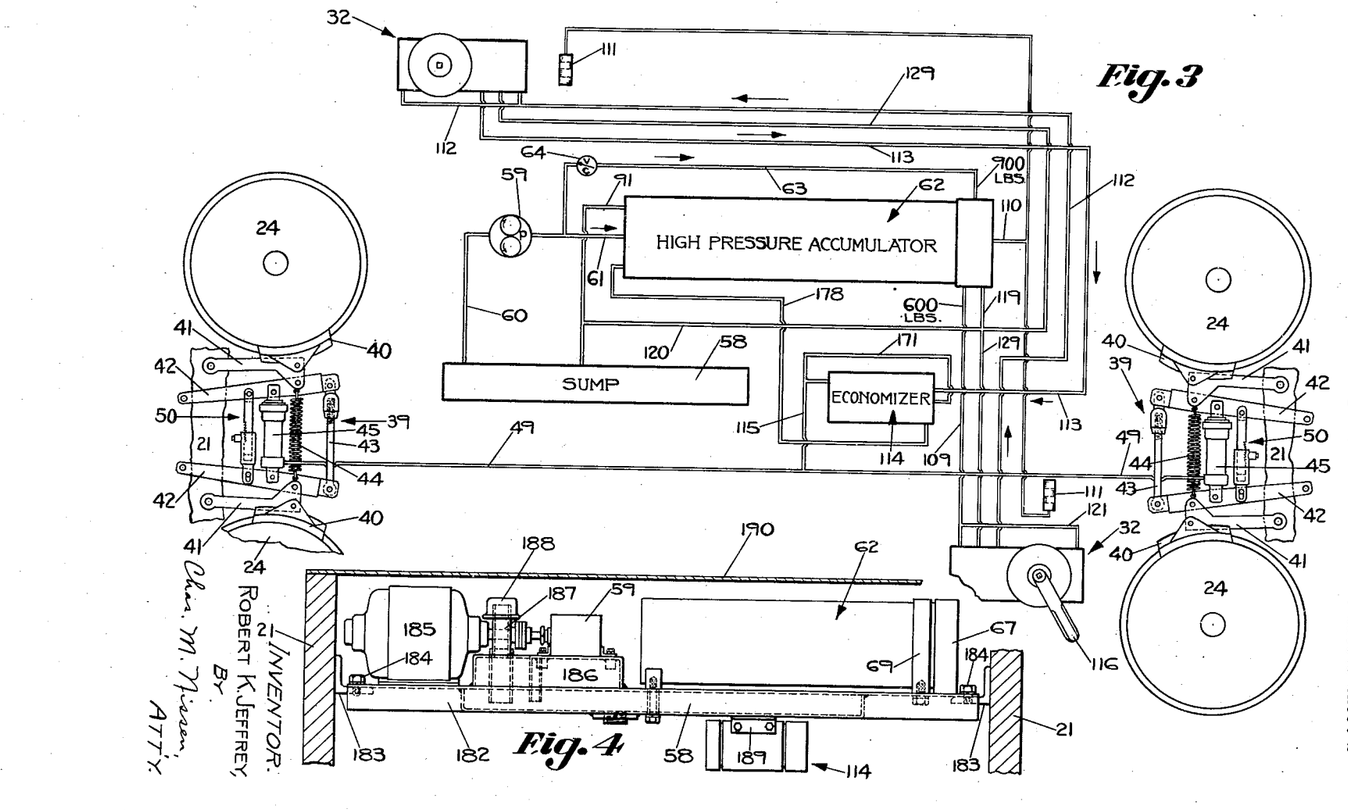
Fig. 3 is a piping diagram of the hydraulic brake system of my invention showing the operating mechanisms schematically.
Fig. 4 is an enlarged view taken on the line 4—4 of Fig. 1 looking in the direction of the arrows.

Attention is now directed particularly to Fig. 3 of the drawings, which discloses schematically the hydraulic system for controlling the braking mechanisms 39. The hydraulic control system comprises an oil or hydraulic fluid sump or reservoir 58 from which the hydraulic fluid is derived by a pump 59 by way of pipe 60 and from which it is fed by pipe 61 to the rear end of a high pressure hydraulic fluid accumulator 62. The pipe 63 branches from the pipe 61 and leads to the head end of the accumulator 62 through a check valve 64 which allows the hydraulic fluid to flow toward said head end but prevents reverse flow thereof.

The function of the accumulator 62 is two-fold. In the first place it accumulates hydraulic fluid under relatively high pressure which is available for operating the hydraulic piston motors or jacks 45 of the braking mechanisms 39 even though the pump 59 has ceased to operate. In the second place it is provided with reducing valve means so that the pressure of the hydraulic fluid delivered from the accumulator is substantially constant over a large range of operation regardless of the pressure in the accumulator or the pressure delivered by the pump 59.

Figure 5:
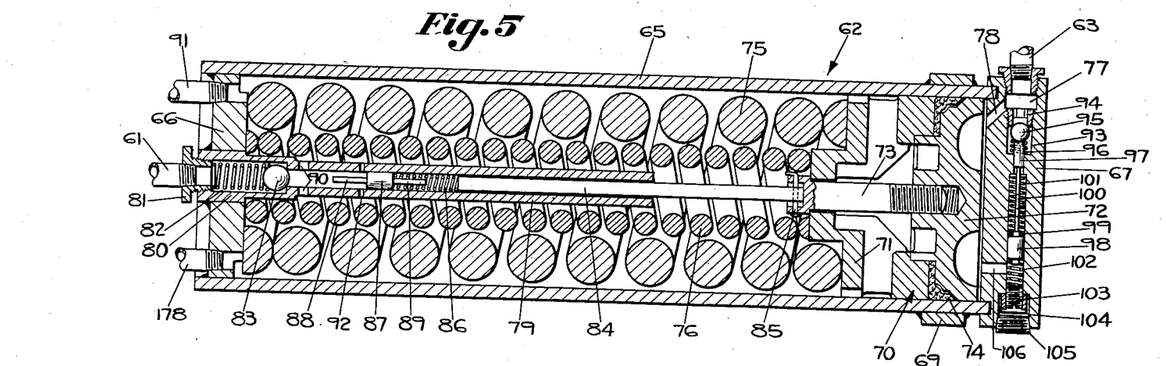
Fig. 5 is a longitudinal sectional view of the accumulator.
Figure 6:
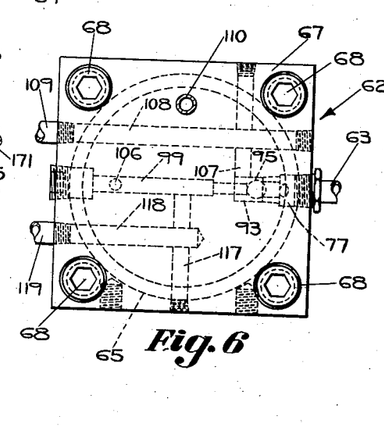
Fig. 6 is an end view of the head end of the accumulator of Fig. 5.

Attention is now directed particularly to Figs. 5 and 6 of the drawings which illustrate in detail the structure of the accumulator 62. Said accumulator comprises a cylinder 65 which forms a housing having its rear end closed by an internal head 66 which is preferably welded at its periphery to the interior wall of the cylinder 65. Cylinder 65 also carries a head plate 67 at its head end which is removably clamped to the cylinder 65 by four corner clamping screws 68 (Fig. 6) which thread into threaded apertures in a square plate 69 welded to the exterior of the cylinder 65 adjacent the head end thereof.

Within the cylinder 65 is a movable piston 70 formed by two parts 71 and 72 which are removably clamped together by a bolt 73. Between the parts 71 and 72 of piston 70 there is a leak-proof cup washer 74 formed of composition material.

Between the left hand face of the piston 70 and the rear head 66 is a large helical compression spring 75 within which is a smaller helical compression spring 76 which is oppositely coiled. The two springs 75 and 76, of course, urge the piston 70 toward the right, as viewed in Fig. 5 of the drawings.

The hydraulic fluid delivered from the pump 59 normally flows by way of pipe 63 to the head plate 67 where it is received by a chamber 77 formed in said head plate 67 and from which it flows by diagonal bore 78 to the interior of the cylinder 65 between the head plate 67 and the piston 70. This hydraulic fluid is generally fed at a relatively but variable high pressure, which as an illustration may be a maximum of nine hundred pounds per square inch when the accumulator is full, and it is effective to force the piston 70 to the left against the action of the springs 75 and 76 consequently storing up within the cylinder 65 in a reservoir formed therein between the head plate 67 and the piston 70 an amount of hydraulic fluid or oil which is available for use to operate the hydraulic jacks 45 at any time whether the pump 59 is operating or not.

Whenever a predetermined amount of oil has been accumulated in the accumulator 62 so that the coil springs 75 and 76 are compressed almost to a solid condition, for example, within one-sixteenth of an inch of a solid compression, and thus to a maximum pressure, a mechanism is provided within the accumulator 62 to form a substantially no-load by-pass for the pump 59.

This by-pass mechanism comprises an elongated cylinder 79 positioned centrally of the cylinder 65 and rigidly attached to the rear head 66 by an integral head 80 which is welded thereto. The head 80 receives the previously mentioned pipe 61 by means of a fitting 81 and has formed therein a chamber 82 housing a spring-pressed check valve 83 which is normally closed due to the pressure thereon provided by the spring and the hydraulic fluid in the pipe 61. However, whenever the piston 70 has moved to the predetermined position above mentioned, the check valve 83 is positively opened by mechanism comprising a rod 84 which is loosely attached by a pin 85 to the head of bolt 73 and which extends into the cylinder 79 and abuts a coil spring 86, the other end of which coil spring abuts a floating piston 87 within the cylinder 79. The piston 87 carries oppositely extending projections 88 and 89. The coil spring 86 is relatively weak, but it is stronger than the coil spring of check valve 83, and even though the projection 88 is moved into contact with the check valve 83 the latter will not be opened due to any compression of the spring 86, because of the high pressure on the check valve 83 caused by the high pressure hydraulic fluid, but it will be quickly opened whenever the projection 89 comes into solid contact with the end of the rod 84 and additional movement of the rod 84 is transmitted to the check valve 83 through the solid linkage including the piston 87 and projections 88 and 89, for once the seal of valve 83 is broken, the hydraulic pressure tending to seal said valve 83 drops appreciably and spring 86 causes it to open very rapidly.

This opening of the check valve 83 is effected when the piston 70 has reached its predetermined position as above described. Such opening of the check valve 83 allows hydraulic fluid to flow into the cylinder 79 from which it can freely flow by means of ports 90 into the cylinder 65 to the left of the piston 70. This will insure the cylinder 65 being substantially full of hydraulic fluid or oil at all times.

There will be no pressure created in the cylinder 65 to the left of the piston 70 because the rear head 66 is provided at its top with a return or drain pipe 91 which leads to the sump 58.

As long as the accumulator 62 is substantially full of hydraulic fluid under high pressure, the aforedescribed no-load by-pass for the pump 59 will be provided and in fact the piston 70 can move to the right from its maximum position of movement to the left, for an appreciable distance, before the no-load by-pass for the pump 59 is shut off. After a predetermined movement of the piston 70, however, to the right from said maximum position, the no-load by-pass for the pump 59 is shut off and the output thereof, if it is in operation, is again delivered to the head end of the accumulator 62. This operates in the following manner. Upon any withdrawal of high pressure fluid from the accumulator 62 while the above mentioned no-load by-pass is effected as aforedescribed, the piston 70 will, of course, move to the right with a similar movement of the rod 84. Due to the fact that the spring 86 is stiffer than the spring associated with the check valve 83, the check valve 83 will be maintained open for some movement of the piston 70 and until spring 86 has been expanded sufficiently that the spring of check valve 83 plus the small pressure drop of the hydraulic fluid flowing past check valve 83 is sufficient to overcome it and close the the check valve 83. Once check valve 83 is closed the by-pass for pump 59 is, of course, shut off and the output required to be fed to the pipe 63.

It may additionally be pointed out that the cylinder 79 carries ports 92 which are for the purpose of preventing any hydraulic lock in the cylinder 79 when the piston 87 is between the ports 90 and 92 and the piston 70 and rod 84 move toward the left. That is, the rod 84 may act as a piston in cylinder 79 and ports 92 provide a free release of the oil between rod 84 and piston 87.

It is thus evident that the accumulator 62 operates automatically to accumulate a predetermined amount of hydraulic fluid under high pressure between the piston 70 and the head plate 67 and provides a no-load by-pass for the pump 59 whenever this predetermined amount of hydraulic fluid under high pressure is accumulated and removes the no-load by-pass from the pump 59 whenever the volume of the accumulated hydraulic fluid under pressure is reduced to a predetermined amount. It is further evident that this hydraulic fluid under high pressure is available for operating the braking mechanisms 39 even though the pump 59 is no longer in operation.

As aforementioned, another feature of the accumulator 62 is that it delivers the hydraulic fluid under pressure for use at a substantially constant pressure regardless of the pressure of the fluid delivered to it. As an illustration, the hydraulic fluid may be delivered from the accumulator at a pressure of six hundred pounds per square inch regardless of the pressure of the fluid delivered to it provided the pressure of the delivered fluid is equal to or in excess of this value. To this end I provide what is, in effect, a reducing valve which is formed in the head plate 67 and which is best illustrated by reference to Figs. 5 and 6 of the drawings.

The chamber 77 within the head plate 67 leads to a chamber 93 by way of a port 94 of predetermined size formed in a removable fitting threaded in said head plate 67. Within the chamber 93 is a check valve including a ball 95 and a spring 96 which overcomes the effect of gravity, urging it into closing position with respect to the port 94. The ball 95 is also contacted by a piston 97 which is surrounded by the coil spring 96 and which slides through a bore in the head plate 67. Piston 97 is connected to another piston 98 in a cylindrical bore 99 in the head plate 67 by a rod 100. A coil spring 101 within the bore 99 urges the piston 98 downwardly as viewed in Fig. 5 of the drawings.

On the bottom of the piston 98 is another coil spring 102 which rests on an adjusting screw 103 which is within a well 104 in the head plate 67 to which access is afforded by a removable screw plug 105. A bore 106 leads from the interior of the cylinder 65 to the cylindrical bore 99 below the piston 98 so that the hydraulic fluid under high pressure in the cylinder 65 communicates with the piston 98 by way of bore 106. The port 94 has the same cross-sectional area as the bore 99. It is therefore evident that the pressure on the ball 95 will be the same as the pressure on the piston 98 which is due to the high pressure hydraulic fluid and these two forces will be in opposite directions and consequently will counterbalance each other.

It may be noted, as best seen in Fig. 6 of the drawings, that the chamber 93 communicates by right angle bores 107 and 108 with a pressure pipe or conduit 109 which leads directly to opposite ends of one of the aforementioned control valves 32 (Fig. 3) and it is, of course, this pressure pipe 109 which conducts the hydraulic fluid under the regulated high pressure for subsequent use in the system.

The liquid must flow past the check valve 95 into the pipe 109 when the brakes are to be applied by operation of the valve mechanism 32, and this may occur at any time even while the accumulator is being filled with the hydraulic pressure medium.

The forces of the springs 96, 101 and 102 may be considered as a single spring, taking into account the fact that spring 101 is positive in character and springs 96 and 102 are negative in character, and their resultant is adjustable by adjusting the screw 103, whereby the pressure of the hydraulic fluid fed to the pipe 109 may be adjustably determined at any desired value.

For instance, if the pressure in the supply pipe is 900 pounds per square inch, the pressure in the chamber 93 may be predetermined to be 600 pounds per square inch by adjustment of the screw 103 which effects adjustment in the tensions of the oppositely acting springs 101 and 102. The equation for equilibrium would then be 900 times the area of the port 94 plus 600 times the area of the piston 97 plus the resultant spring pressure equals 900 times the area of the piston 98 plus 600 times the area of the port 94. Since the area of the port 94 equals the area of the piston 98, the equation may be simplified by eliminating from one side of the equation the 900 times the area of the port 94 and eliminating from the other side of the equation the 900 times the area of the piston 98. By solving the equation, it can readily be seen that the desired resultant spring pressure will then be 600 times the difference between the area of the port 94 and the area of the piston 97.

An analysis of the forces acting to effect closure of the check valve 95 when the pressure in the chamber 93 reaches 600 pounds per square inch while the pressure in the supply pipe 63 is 900 pounds per square inch will clarify the foregoing equation. The back pressure of 600 pounds per square inch in the chamber 93 acts on the bottom of the ball valve 95, as viewed in Fig. 5, over the area of the port 94 and such back pressure also acts on top of the piston 97. Also acting upwardly on the ball 95 is the spring 96. Acting downwardly on the pistons 97 and 98 is the spring 101 and acting upwardly on the piston 98 is the spring 102. Also acting downwardly on the ball 95 is the 900 pounds per square inch and there is also an upward pressure on the piston 98 of 900 pounds per square inch and since these balance each other they may be eliminated from the equation.

The resultant action of the springs is downward as viewed in Fig. 5 because the downward force of the spring 101 is greater than the combined upward forces of the springs 96 and 102.

The structure at the right-hand end of Fig. 5 is shown vertical and so described to facilitate disclosure but it should be understood that it may occupy any desired position including a horizontal position or an inclined position.

It may be pointed out that a pipe 110 leads to the interior of the cylinder 65 adjacent the high pressure end thereof and to pressure gauges 111, there being one adjacent each of the control valves 32 so the operator at either operating station may be apprised of the pressure of the fluid in the accumulator 62.

In addition, the bore 99 communicates by means of cross-bores 117 and 118 with a drain pipe 119 which feeds into a main return or drain pipe 120 connecting with the aforedescribed drain pipe 91 leading to sump 58. This provides for free drainage of any hydraulic fluid reaching bore 99 above the piston 98, as viewed in Fig. 5 of the drawings.

This hydraulic fluid under a regulated high pressure flowing in the pipe 109 as distinguished from the hydraulic fluid under unregulated high pressure flowing to the pipe 63 is fed to one of the control valves 32 where another reducing action is effected which may be readily adjusted over a wide range so that the pressure of the hydraulic fluid delivered from the valve 32 may be readily adjusted.

Before describing the structure of the control valves 32 it may be pointed out, as shown in Fig. 3 of the drawings, that the hydraulic fluid is conducted by pipe 109 to one of the control valves 32 and thence by a pipe 112 to the other of said control valves 32 from whence it flows by pipe 113 to an economizer 114 which economizes the use of the high pressure hydraulic fluid from which economizer hydraulic fluid is delivered by way of pipe 115 to the previously mentioned feed pipe 49 leading to the two hydraulic piston motors or jacks 45 connected in parallel.

It may be stated that only a single operating handle 116 is provided for the two control valves 32 and it is so arranged, as hereinafter described, that said handle 116 can be removed from one control valve 32 for use on the other control valve 32 by adjusting the one control valve from which the handle is removed to the full on position, under which conditions, as hereinafter described, the hydraulic fluid flows freely through the control valve 32 from which the handle 116 has been removed, without effect.

Attention is now directed particularly to Figs. 8, 9 and 10 of the drawings in which the structure of the two control valves 32 is fully disclosed. The hydraulic fluid under regulated pressure is fed by pipe 109 and by branch 121 thereof to chambers 122 and 123 respectively, formed in the base 124 of the control valve 32. A longitudinally extending bore is formed between the two chambers 122 and 123 providing cylinders 125, 126 and 127 which, of course, are the same size and are in axial alignment. Associated with the cylinder 126 is a chamber 128 which leads to a drain pipe 129 connected to the return or drain pipe 120. Intermediate the chambers 122 and 128 is a chamber 130 which is connected by right angle bores 131 and 132 to the aforedescribed pipe 112. The bore 132 also communicates with the aforementioned cylinder 126.

Slidably mounted in the cylinder 127 is an elongated piston 133 which extends into the chamber 123 at one end and into an enlarged cylindrical chamber 134 at its other end, which other end abuts a coil spring 135 which in turn abuts a piston 136 adapted to slide between cylinders 125 and 126. The piston 133 is provided with a notch 137 which receives the head 138 of an operating lever 139 which is attached to the bottom of an upright shaft 140 (see Fig. 10) which extends through a removable cover plate 141 removably attached to the base 124, as by screws 142. As clearly illustrated in Fig. 10 of the drawings, a packing gland or stuffing box 143 is provided for the shaft 140 in the cover plate 141.

The shaft 140 is provided with a square head to receive a square opening in operating handle 116, which handle carries at its bottom a lug 144 carrying a pair of spring-pressed balls 145, 146, the former of which is adapted to ride on an arcuate surface 147 formed on the cover plate 141 and at selected points to drop into notches 148 and 149, the former of which indicates the drain position of the valve 32 and the latter of which indicates what is termed the lap position which, as hereinafter described more completely, is the position of the handle 116 when the piston 136 laps the chamber 130.

The ball 146 is part of a signalling mechanism which also includes an adjustable arcuate plate 150 adjusted for rotary movement with respect to the cover plate 141 by virtue of the elongated slots 151 associated with the clamping set screws 152 which thread into the cover plate 141.

It is to be noted by reference to Fig. 8 of the drawings, that the plate 150 is provided with a ledge 153 and the plate 150 is so adjusted that the ball 146 hits the ledge 153 just before the braking action of the braking mechanisms 39 is sufficient to slide the wheels 24 of the mine locomotive. As is well known, the dynamic friction is less than the static friction and consequently the maximum braking action is not effected when the wheels 24 of the mine locomotives are sliding on the mine rails, but said maximum braking action is effected just before the braking mechanisms 39 lock said wheels 24.

The ledge 153 provides a slight shock which can be felt in the handle 116 as it is moved in a clockwise direction from the drain position which is at the extreme right hand position, as illustrated in Fig. 8, to the full on position which is in the position actually illustrated in Fig. 8 of the drawings, thus signalling to the operator when the maximum braking action is effected. The adjustment of the plate 150 provides for the adjusting of this signal position in accordance with actual tests on the mine locomotive.

It is furthermore to be noted, particularly by reference to Figs. 8 and 9 of the drawings, that the removable cover plate 141 is provided with a cap 154 which so overhangs the handle 116 that said handle 116 can only be removed from the head of shaft 140 when it is in the full on position or the position illustrated in Fig. 8 of the drawings. When in this position it may be readily removed by being lifted vertically. When the handle 116 is in the full on position the parts of the control valve 32 are in the positions illustrated in Fig. 8 of the drawings and it is to be noted that a free passageway is thus afforded from the pipe 109 to the pipe 112 by way of chamber 122, cylinder 125, chamber 130, bore 131 and bore 132.

To effect a progressive reduction in the pressure of the hydraulic fluid delivered to pipe 112 the handle 116 is adjusted counter-clockwise from the position illustrated which produces a progressive decreasing pressure in the fluid delivered to said pipe 112 until said pressure is zero when ball 145 falls in the lap notch 149, under which conditions the piston 136 extends to the left from the position illustrated in Fig. 8 into the cylinder 125 or, in other words, it laps the two chambers 128 and 130.

In the actual operation of the valve 32 the movement of the lever 116 in applying the hydraulic brakes is, of course, effected in a reverse direction from that above described, that is, the handle 116 at the operator's position will normally be in the drain position, or with the ball 145 in the drain notch 148. It may be pointed out that under these conditions the spring 135 is compressed solid and the piston 136 is moved to the left from the position illustrated in Fig. 8 so that free passage is provided between the chambers 132 and 128 by way of cylinder 126. Under such conditions it is, of course, evident that the hydraulic piston motors or jacks 45 are free to contract and drain the hydraulic fluid through pipe 49, as hereinafter described in complete detail.

An operator in operating the handle 116 to apply the brakes of the hydraulic control system will move said handle 116 first from the drain position to the lap position which is without noticeable effect externally but which within the control valve 32 is effective to move the piston 136 to the aforementioned lap position in which the free passageway effected by the drain position between chambers 132 and 128 is cut off. If the handle 116 is moved further in a clockwise direction from the lap position this produces an expansion of the coil spring 135, which expansion is progressively increased with progressive movement of the handle 116 in a clockwise direction, and as aforementioned, is effective to supply hydraulic fluid to the pipe 112 under progressively increasing pressures, there being a predetermined pressure in the pipe 112 for each position of the handle 116 varying from zero when the handle is in the lap position to the maximum available which, in the illustration given, is six hundred pounds, when the handle 116 is in the full on position illustrated in Fig. 8 of the drawings.

Furthermore, for any position whatever of the handle 116 the pistons 136 and 133 are in balance and consequently it is not necessary to latch the handle 116, but it will remain in any position to which it is adjusted. This is because of the fact that both of the pistons 133 and 136 are subjected on their outer ends to the pressure in the pipes 109 and 121 and are of the same area. Furthermore, the inner ends of the two pistons 133 and 136 are subjected to the same pressure which is the pressure in the pipe 112 and in bores 131, 132 and chamber 134.

As above mentioned, when the handle 116 is in the lap position, piston 136 laps the chambers 128 and 130 and this, of course, prevents any flow of hydraulic fluid from pipe 109 to pipe 112, particularly because of the lap of piston 136 over chamber 130. If the handle 116 is then moved in a clockwise direction the spring 135 is expanded an amount determined by the extent of said clockwise movement. This expansion of the spring 135 allows the high pressure, of six hundred pounds per square inch in the illustration given, in the chamber 122 to move the piston 136 to the right due to the reduction in the force provided by spring 135, which allows a flow of hydraulic fluid through the chamber 130 and bores 131 and 132 to pipe 112 which is ultimately employed to expand the hydraulic motors or jacks 45. After a relatively small amount of flow of fluid, as aforesaid, it is evident, of course, that the pressure in bore 132 will increase over what it previously was and this acting on the right hand face of the piston 136 together with the force of the spring 135 acting thereon in an amount determined by the position of handle 116 will force the piston 136 again into lapping position with respect to the chamber 130. In other words, whenever handle 116 is moved to any desired position between the lap position and the full on position an amount of hydraulic fluid is fed from pipe 109 to pipe 112 by way of chamber 122, cylinder 125, chamber 130 and bores 131 and 132 to create a predetermined pressure in the bore 132 which may be of a variable value as determined by the position of the handle 116 and as soon as this predetermined pressure is realized in accordance with the setting of the handle 116, piston 136 automatically returns to the lapping position with respect to the chamber 130. In other words, the handle 116 adjusts the pressure which the spring 135 exerts on the piston 136 depending upon the position of said handle 116 and consequently the pressure in the pipe 112 may be selectively adjusted to any value from the maximum of six hundred pounds per square inch, in the illustration given, to zero, by adjusting the position of the handle 116. Furthermore, as above pointed out, the forces acting on the pistons 133 and 136 are always neutralized and consequently the handle 116 will stay in any position to which it is adjusted without requiring any locking thereof. Still further, any tendency toward pressure variations in chamber 132, such as might be caused by "pumping" of a jack 45, due to wheel eccentricity or other causes, is fully compensated for.

Still further, the series circuit of the two valves 32 is provided by virtue of the fact that when the parts are adjusted to the full on position there is a wide open passageway between the pipes 109 and 112. This also applies to the similar pipes 112 and 113 associated with the control valve 32 at the top of Fig. 3 of the drawings.

As was previously pointed out, after the hydraulic fluid has passed from the pipe 109 through the two control valves 32 in series by way of pipe 112 and 113 it is delivered by said pipe 113 to the economizer 114, the function of which is to economize in the use of the high pressure hydraulic fluid.

Figure 7:
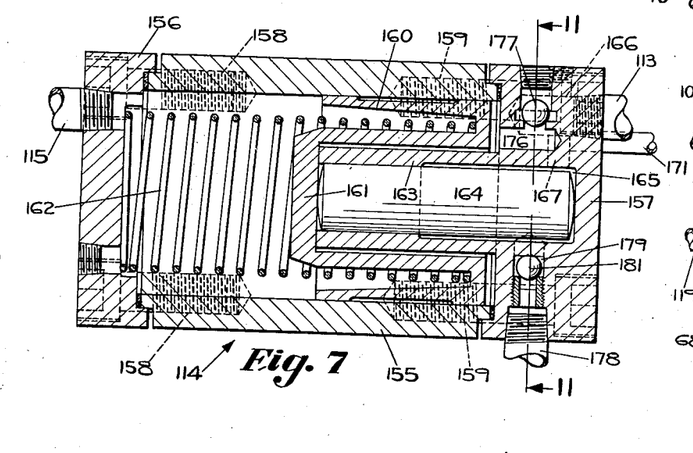
Fig. 7 is a longitudinal sectional view of the economizer.

Attention is now directed particularly to Fig. 7 of the drawings, and to the construction of the economizer 114. The function of this economizer is to multiply the effective volume of the high pressure hydraulic fluid required to take up the slack in the braking mechanism 39 and reserve for substantially direct action in which the hydraulic fluid under high pressure is employed in a one to one ratio to the doing of work which requires the relatively high pressure hydraulic fluid. That is, the effective volume of the high pressure hydraulic fluid is multiplied, for example, in a ratio of five to one for taking up the slack in the braking mechanisms 39 after which the hydraulic fluid under high pressure, which, of course, is controlled by one of the valves 32, is effectively directly applied to said braking mechanisms 39.

Attention is now directed particularly to Figs. 7 and 11 of the drawings, which disclose in detail the structure of the economizer 114. Said economizer comprises a square casing 155 having a cylindrical interior, and provided with a rear head plate 156 and a front head plate 157 which head plates 156 and 157 are attached to the casing 155 as by screws 158 and 159, respectively.

Within the cylindrical interior of the casing 155 is a piston 160 provided with a central recessed portion 161. The piston 160 is urged to the right, as viewed in Fig. 7, by a relatively weak coil spring 162. The head plate 157 is provided with an integral cylindrical portion 163 which extends into the cylinder 155 and within which is a sliding piston 164 one end of which abuts the recessed portion 161 of the piston 160 and the other end of which extends into a chamber 165 formed in the cylindrical portion 163 of the head plate 157. The pipe 113 threads into an opening 166 in the head plate 157 which opening is connected by a bore 167 to the chamber 165.

The previously mentioned pipe 115 which leads directly to the feed pipe 49 connecting the two hydraulic jacks 45 in parallel is received by a threaded opening in the rear head plate 156.

The interior of the casing 155 to the left of the piston 160 is always filled with hydraulic fluid which is normally under very low pressure insufficient to expand the hydraulic jacks 45. When hydraulic fluid under pressure having a value determined by the position of handle 116 of one of the control valves 32 is supplied to pipe 113 it is conducted through opening 166 and bore 167 to chamber 165. This hydraulic fluid then acts on piston 164 which has a much smaller area than piston 160, the ratio of which areas may be anything desired, for example, from one to two to one to ten, and in the illustration given, it is approximately one to five.

It is thus evident that the volume of high pressure fluid employed to move the piston 160 will be in the ratio of one to five to the volume of relatively low pressure hydraulic fluid delivered from the cylinder 155 to the left of piston 160 to the pipe 115. This relatively large volume of hydraulic fluid is employed to take up all the slack in the braking mechanisms 39 and to begin the application of friction on the wheels 24 through the shoes 40. In general, however, this braking action will be relatively small and insufficient to effect the necessary braking action to reduce the speed of the vehicle or stop it. The economizer, however, acts automatically to effect this application of a relatively large volume of hydraulic fluid to take up the slack until the pressure on the piston 160 due to the resistance offered by the braking mechanisms increases beyond that at which continued movement of said piston 160 is impossible through the piston 164. Under these conditions a very small volume of high pressure fluid is necessary to effect the ultimate and effective braking action and this is effected by a direct feeding of the hydraulic fluid under high pressure in the pipe 113 to the pipe 115 over a path now to be described.

By reference particularly to Fig. 11 of the drawings, it will be seen that the opening 166 communicates with a chamber 168 in which there is a tapered cone check valve 169 which controls the flow of hydraulic fluid to a chamber 170 which connects to a by-pass pipe 171 (see Fig. 3), leading to aforementioned pipe 115. The check valve 169 is provided with an elongated stem 172 which seats on an adjustable plug 173 which may be reached for adjustment by a chamber 174 normally closed by a set screw 175. The adjusting plug 173 is so adjusted that the check valve 169 when in its closing position, as illustrated in Fig. 11 of the drawings, does not make an absolute seal between the chambers 168 and 170, but provides a very small area passageway so that normally there will be practically no flow of fluid past this check valve since the fluid can flow relatively freely by way of bore 167 into the chamber 165. However, when the piston 160 is moved as far as it can under the influence of the piston 164, the pressure in the chamber 165 will, of course, reach the pressure in the pipe 113 and this is a relatively high pressure. Thereafter a small amount of high pressure fluid sufficient to effect a required operation will flow directly from opening 166 to chamber 168 thence to chamber 170 by way of the small opening provided by check valve 169 into pipe 171 and pipe 115 which leads directly to the feed pipe 49 of the two hydraulic jacks 45. Thus the high pressure in the pipe 113 at whatever value it is adjustably determined by whichever control valve 32 is in operation is applied directly to the hydraulic jacks 45 after the slack has all been taken out of the braking mechanisms 39.

After the brakes have been applied it is, of course, evident that they will be locked in the applied position so long as the handle 116 associated with the control valve 32 which is being employed, is not moved. When, however, the handle 116 is moved to the drain position the pipe 113 is connected to the drain pipe 129 either directly or by way of the pipe 112, and the piston 160 is then returned to its normal position, as illustrated in Fig. 7, under the influence of the coil spring 162 and the hydraulic fluid which is to the right of said piston 160 is fed by way of bore 176 and check valve 177 which is formed in the front head plate 157, to said pipe 113 and ultimately to the sump 58.

In addition to the structure above pointed out, it is also to be noted that as the piston 160 moves to the left from the position illustrated in Fig. 7, oil under very low pressure is drawn into the right end thereof by way of a pipe 178 which, as best seen in Fig. 3 of the drawings, connects the bottom of the accumulator 62 with a chamber 179 in said head plate 157 which communicates with the interior of cylinder 155 to the right of cylinder 160 by way of bore 180 (see Fig. 11), under the control of check valve 181.

As hereinafter described, the economizer 114 is preferably positioned physically below the accumulator 62 so that under the action of gravity the hydraulic fluid will flow freely from said accumulator 62 through pipe 178 past check valve 181 into chamber 179 and bore 180 into the cylinder 155 to the right of piston 160 whenever said piston 160 is moved to the left, as aforedescribed. Reverse movement of the piston 160 feeds the hydraulic fluid to the right thereof back into the pipe 113, as aforedescribed.

Attention is now directed particularly to Figs. 1 and 4 of the drawings, and to the physical structure of certain other elements of the hydraulic braking system. It is to be noted that the reservoir 58 is formed between the downwardly extending flanges of a transverse channel 182 which extends transversely of the locomotive along the center thereof and between the side plates 21, 21 from which it is supported by brackets 183, 183 to which the channel 182 is attached by screws 184, 184.

Mounted upon the channel 182 is an electric driving motor 185 which drives the pump 59 which is mounted upon a base 186 forming a part of the sump 58. The base 186 also is provided with an oil receiving pipe 187 having a removable breather cap 188, which pipe 187 is adapted to receive hydraulic fluid or oil to replenish that lost in the system.

Also mounted upon the channel 182 is the aforementioned accumulator 62 below which and suspended from said channel 182 by bracket means 189 is the aforementioned economizer 114. It is to be particularly noted that this mechanism requires a relatively small amount of space and the parts are compactly positioned between the side walls 21 of the mine locomotive and in addition are fully protected by the mine locomotive cover plate 190.

Attention is now directed particularly to Figs. 14 to 19, inclusive, of the drawings, in which there is illustrated a modified form of hydraulic braking system as applied to a different vehicle, illustrated as a truck, though the system may be employed with other vehicles, such as heavy automobiles, tractors and the like. The truck illustrated comprises a main frame 200 supported upon a pair of front wheels 201 and a pair of rear wheels 202 through leaf springs 203 and 204, respectively. The truck is provided with the conventional motor 205 which drives the rear wheels 202 through a gear transmission 206, drive shaft 207 and differential 208. The truck also is provided with a body 209 for carrying material and an operator's cab 210 adjacent which are the usual control mechanisms including a steering wheel and manual or foot operated brake pedal 212.

Figure 19:
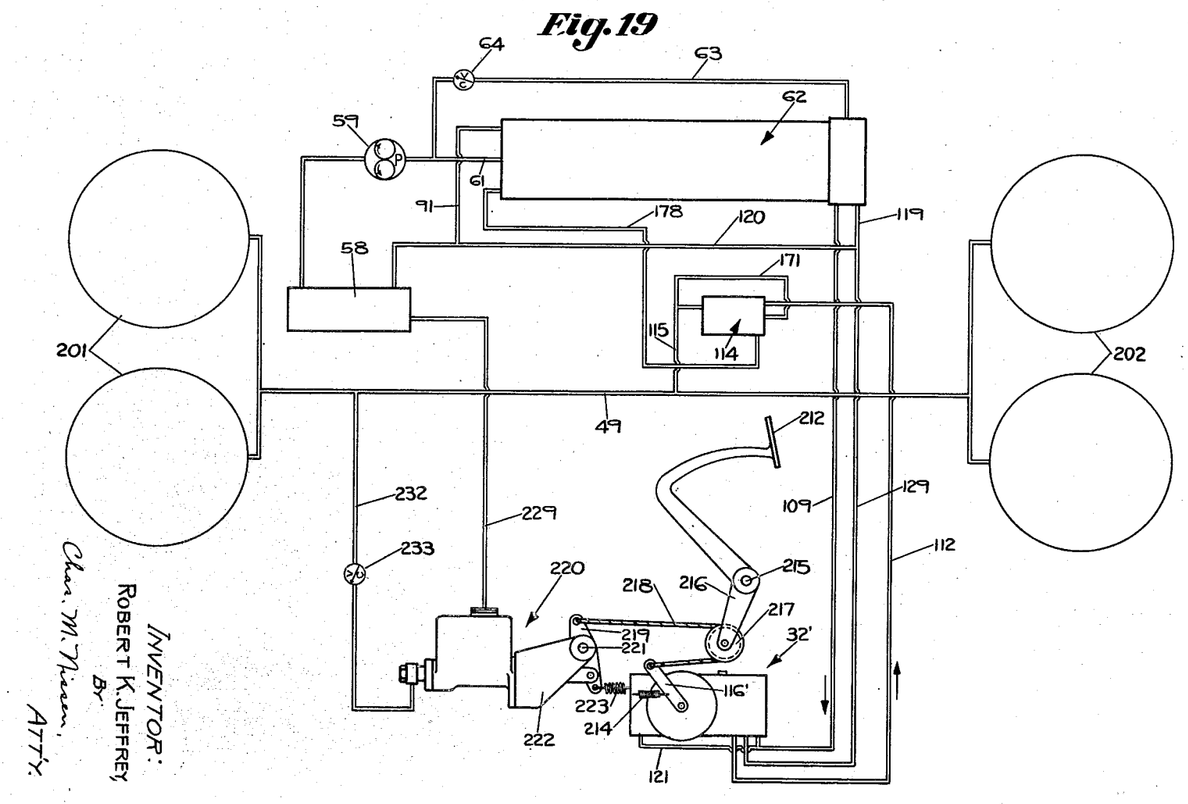
Fig. 19 is a piping diagram with certain mechanical parts illustrated diagrammatically, of the combined power and manually operable braking system employed with the truck of Fig. 15.

Below the cab 210 and supported by the side members of the frame 200 is a channel 213 on top of which is supported the accumulator 62 of the hydraulic system and on the bottom of which is suspended the economizer 114. The hydraulic control system for the truck is disclosed in Fig. 19 of the drawings and it is to be understood, except for the differences which are specifically pointed out, the power operated hydraulic system corresponds to the system above described. In other words, Fig. 19 shows generally the system of Fig. 3 adapted to self-propelled trucks instead of mine locomotives.

It may be mentioned, however, that in place of the two control valves 32 of the system of Fig. 3 the system of Fig. 9 employs only a single control valve which is seen at 32'. The detailed structure of this control valve is essentially the same as that of the control valves 32 except, however, that the operating lever 116' is not removable and it is biased by a relatively weak spring 214 to the drain position of said control valve 32'. In addition, the lever 116' is not provided with any balls similar to the balls 145 and 146 and the signal mechanism, including the adjusting plate 150, is omitted.

The lever 116' of the control valve 32' is controlled by the manually operable foot pedal 212 which is pivoted at 215 to the truck frame 200 through an integral arm 216 which carries a roller 217 about which is reeved a cable 218, one end of which is attached to the upper end of the lever 116' and the other end of which is attached to a pivoted arm 219 of a manually operable hydraulic fluid braking cylinder designated generally by the reference character 220.

Figure 16:
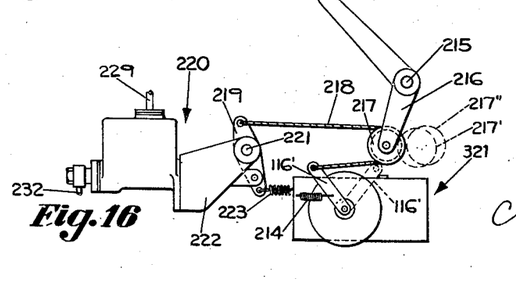
Fig. 16 is a side elevational view of a power-controlled valve and a manually operable hydraulic control cylinder of the combination hydraulic brake system of Fig. 19.
Figure 17:
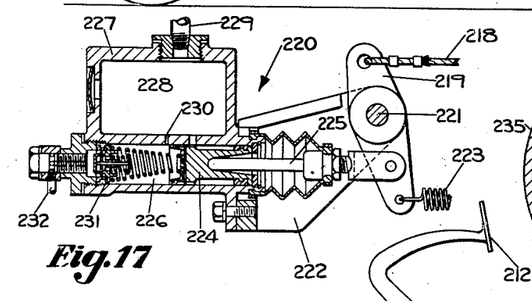
Fig. 17 is a sectional view of the manually operable hydraulic cylinder of Fig. 16.

The arm 219 is pivoted at 221 to a bracket 222 carried by said master cylinder 220 and is biased by a relatively strong spring 223 to the position illustrated in Figs. 16 and 17 of the drawings. The springs 214 and 223 are so related that upon operation of the brake pedal 212 the lever 116' is first moved to the full on position which is the dotted line position illustrated in Fig. 16 of the drawings, at which position the roller 217 is in the position illustrated by the dotted circle 217'. Up to this position of adjustment the arm 219 is not moved from its normal position. It is thus evident that the power operated hydraulic system is thrown into full operation without any effect being produced on the manually operable hydraulic braking system.

However, in case of a failure in the power operating system due to any cause, further movement of the brake pedal 212 which results in movement of the roller 217 from the position of dotted circle 217' to the position of dotted circle 217'' is effective to produce swinging movement of the arm 219 to bring into operation the manually operable hydraulic system including particularly the master cylinder 220. That is, whenever arm 219 is swung clockwise from the position illustrated in Figs. 16 and 17 of the drawings, it is effective to move the operating piston 224 to the left through the mechanical linkage 225 pivoted to the bottom of the arm 219, which piston 224 moves in a cylinder 226 formed in the bottom and the casing 227 of the master cylinder 220 which also includes a reservoir 228 which is maintained filled with hydraulic liquid by virtue of a pipe 229 connected to the bottom of the reservoir or sump 58.

It is, of course, evident that movement of the piston 224 past the port 230 in the bottom of reservoir 228 is effective to trap hydraulic fluid in said cylinder 226 and to force it through a control valve 231 into the pipe 232 which is directly connected to the aforedescribed feed pipe 49 through a check valve 233 which prevents reverse flow of fluid through said pipe 232.

It may be pointed out that the master cylinder 220 is per se of standard design employed in hydraulic control braking systems for automobiles and therefore needs no detailed description of the individual parts.

Figure 18:
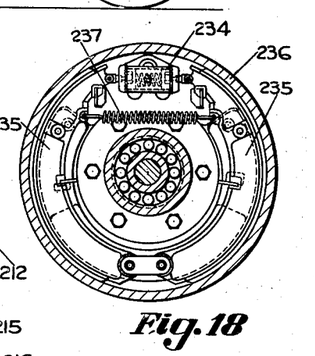
Fig. 18 is a sectional view showing the brake operating mechanism for each of the wheels of the truck of Fig. 15.

It may additionally be pointed out that in the apparatus and system of Figs. 14 to 19, inclusive, the feed pipe 49 feeds four hydraulic piston motors 234 of a structure common to hydraulic braking systems of automobiles, one of which is seen in Fig. 18 of the drawings, it being understood that there will be one such piston motor 234 associated with each wheel 201 and 202 of the vehicle.

Briefly described, the braking mechanism associated with each piston motor 234 comprises brake shoes 235 associated with a brake drum 236 which is rigidly attached to rotate with a wheel 201 or 202, the brake shoes 235 being urged to brake releasing position by a coil spring 237 which also urges the piston motor 234 to its contracted position.

In the operation of the vehicle and the system disclosed in Figs. 1 to 13 of the drawings, which, as illustrated, is a mine locomotive but which may be some other type of vehicle, it is evident that the braking mechanisms 39 on the opposite sides of the vehicle associated with the wheels 24 may be operated either manually through the operating mechanisms, including hand wheels 33, or they may be operated by a power hydraulic system and either operation may be effected from either end of the vehicle.

The operation by which the brakes are manually applied by controlling the hand wheels 33 is believed obvious from the above description. Briefly described this operation includes the rotation of either hand wheel 33 to swing one of the levers 42 associated with each braking mechanism 39 rearwardly about the pivot point thereof found at its bottom which simultaneously applies all of the brake shoes 40 to the four wheels 24. Likewise, the power operated hydraulic control is provided for operating the two braking mechanisms 39 simultaneously from either end of the vehicle by controlling either one of the control valves 32 while the other is in its full on position (Fig. 8) to which it must be adjusted to permit removal of the single operating lever 116 which is employed with the two control valves 32.

Assuming that the vehicle is traveling along the rails 25 of the mine track and it is desired to apply the brakes, the operator merely moves the handle 116 from its normal drain position, which is the extreme right hand position, as viewed for example, in Fig. 8 of the drawings, in a clockwise direction. The pressure applied to the hydraulic piston motors or jacks 45 is adjustable to any value between zero and the maximum available pressure in accordance with the setting of the lever 116 so that the braking action on the wheels 24 may be set at any desired value and the braking action may be maintained at this set value. Furthermore, the brakes may be readily released by returning the handle 116 to the drain position or they may be set and locked with any pressure exerted on the wheels 24.

The accumulator 62 is effective to maintain a reserve supply of hydraulic fluid under high pressure which is available even though the pump 59 has stopped and this is particularly important in connection with a mine locomotive for in case of a failure of power or in case a trolley 29 jumps off of the power line, the hydraulic brakes will not be rendered inoperative. Furthermore, in case of any accident which rendered the pump 59 inoperative there is still available a sufficient supply of hydraulic fluid under pressure to operate the brakes for a number of times, thus insuring that the vehicle can be stopped even under the most adverse conditions. It is, of course evident that as a final precaution the mechanical brakes are always available in case the hydraulic system fails completely.

Furthermore, the economizer 114 operates automatically to take up all the slack in the brake mechanisms 39 with a minimum consumption of hydraulic fluid which is under high pressure and this conserves appreciably the hydraulic fluid under high pressure. It is, of course, evident that the economizer 114 may be omitted if this economizing feature is not desired or the ratio of operation thereof may be adjusted to any desired value depending upon the sensitivity desired and the amount of conservation of high pressure hydraulic fluid also desired.

Figure 20:
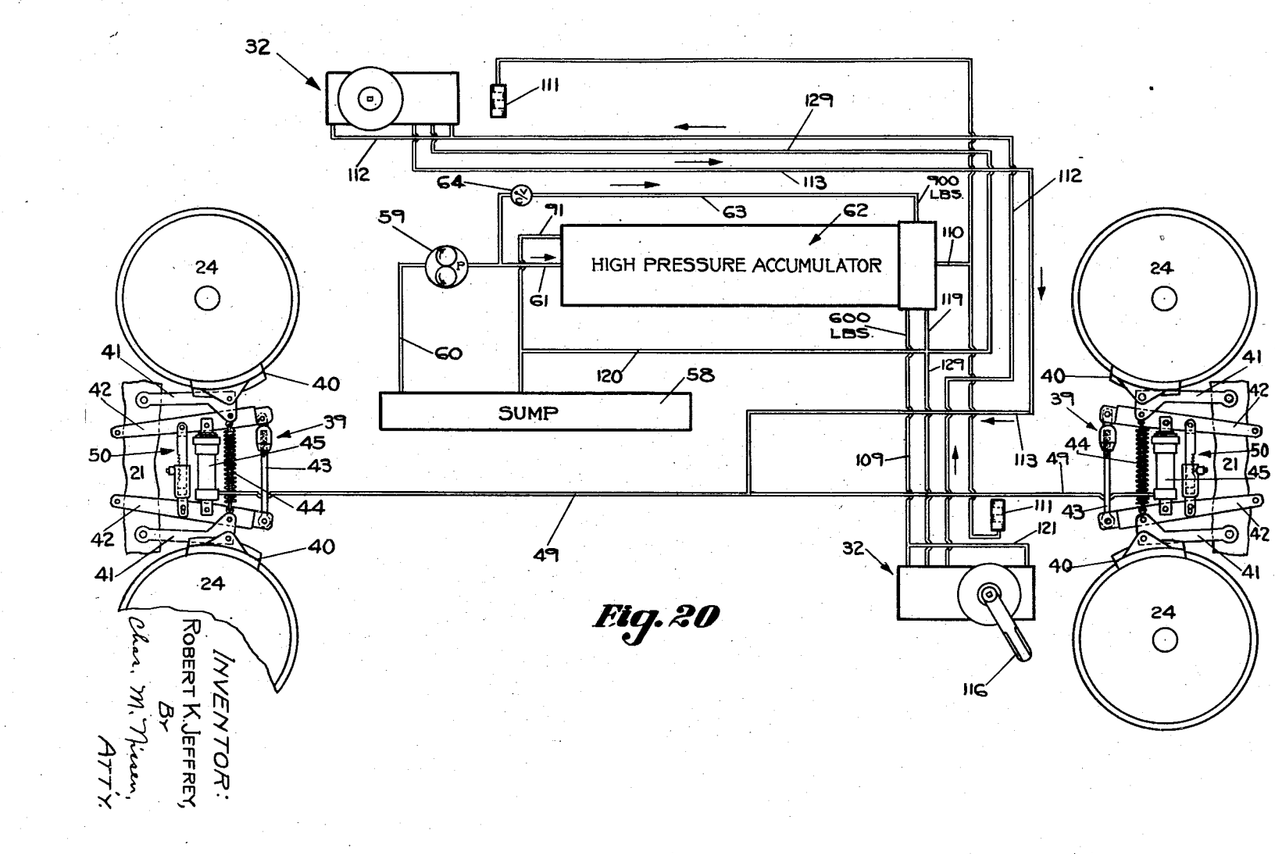
Fig. 20 shows a piping diagram of the system of Fig. 3 with the economizer omitted.

If the economizer 114 is omitted, the piping diagram as illustrated in Fig. 20 results. Here the pipe 113 leads directly to feed pipe 49 and pipe 178 is omitted, its receiving hole in head 66 being plugged.

The operation of the system of Fig. 19 is generally similar to that above described but in this case the power operated hydraulic system is normally the only one employed and the brakes will normally always be operated by it due to the fact that control valve 32' will be operated to full open position before the master cylinder 220, which is manually controlled by direct action of the brake pedal 212, is brought into play. However, in case of any failure in the power operated hydraulic system, the brake 212 during the last portion of its stroke acts as the conventional manually operable hydraulic braking system to apply the brakes. This, of course, provides a safety feature in case of anything going wrong with the power operated hydraulic system.

It may be additionally pointed out that in the system of Fig. 19 the check valve 233 and the check valve which is formed by the ball 95 (see Fig. 5), and the small spring 96 associated with it, insure the proper operation of the power operated hydraulic system and the manually operated hydraulic system in feeding hydraulic fluid to the feed pipe 49, which, of course, is common to both of them. That is, when the power operated system is operated to feed hydraulic fluid to feed pipe 49, check valve 233 prevents any flow of this hydraulic fluid reversely through the pipe 232 and whenever the manually operated hydraulic system is brought into play the check valve formed by the ball 95 and spring 96 prevent the hydraulic fluid in pipe 49 flowing reversely through the pipe 109. It is for this reason that the spring 96 is provided.

It is thus evident that I have provided a vehicle with combined mechanical and power operated hydraulic brake operating mechanisms which are very flexible in operation, insure a high degree of safety and yet which are relatively simple in construction.

Figure 21:
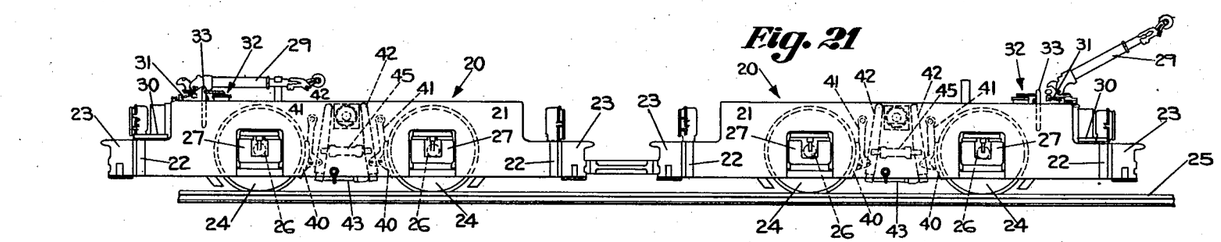
Fig. 21 is a side elevational view of two mine locomotives of a train connected in tandem.
Figures 22, 23:
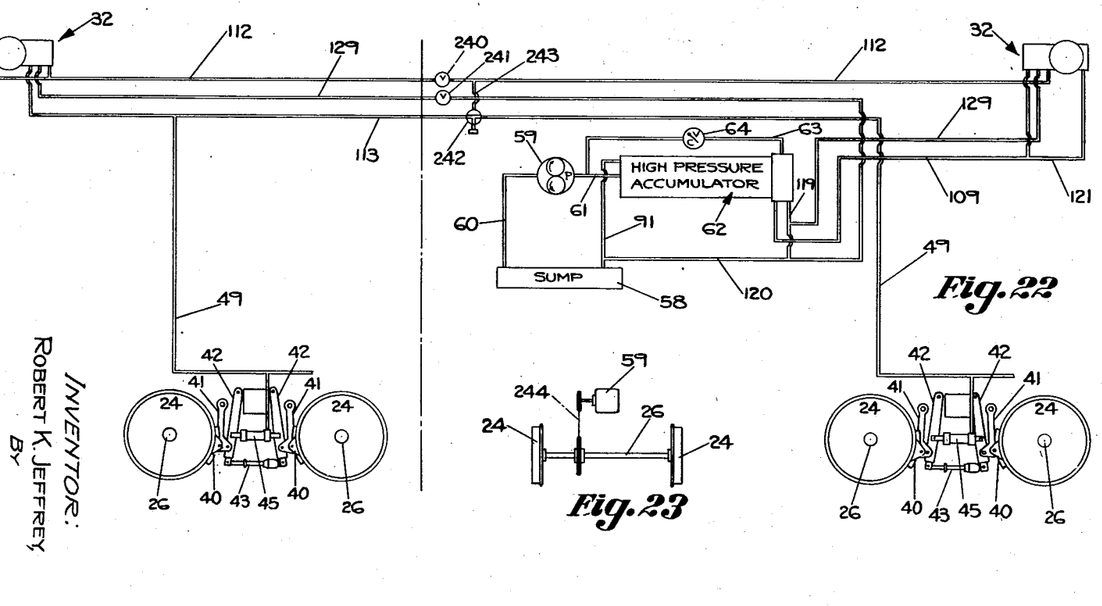
Fig. 22 is a piping diagram of the preferred hydraulic system employed with the tandem locomotives.
Fig. 23 is a schematic illustration of a wheel drive for the pump.

In Fig. 21 of the drawings I have illustrated an important modification of my invention in which two vehicles, which are here represented as my locomotives, are connected in tandem and are controllable by an operator on either of them to apply the brakes to both of them. The hydraulic system for this modification is illustrated in Fig. 22 of the drawings. As illustrated, each of the locomotives is provided with a single control valve 32 adjacent one end thereof. By reference, particularly to Fig. 22 of the drawings, it is of course evident that only a single high pressure accumulator 62, pump 59 and associated mechanism of the hydraulic system is provided, all of it being situated on one of the mine locomotives as illustrated. They are situated on the mine locomotive illustrated at the right in Fig. 21 and the vertical dot and dash line of Fig. 22 indicates the division between a portion of the hydraulic system carried by the two locomotives.

In view of the above description of the hydraulic system of Figs. 3 and 20, the principal elements of the hydraulic system of Fig. 22 require no further description. However, there are certain added elements now to be pointed out.

It is of course evident that the conduits 112, 113 and 129 extend between the two vehicles. They are therefore flexible, at least in part, and are provided with coupling means so that they may be connected and disconnected to permit removal of the coupled relation of the two locomotives. Furthermore, associated with the righthand locomotive is a closure valve 240 for closing line 112, a closure valve 241 for closing line 129 and a three-way valve 242 which, in its normal position, provides the continuity of the conduit 113 between the two locomotives and which may be adjusted to connect conduits 112 and 113 by way of by-pass 243 whenever the locomotives are disconnected. In case of such disconnection, valves 240 and 241 are closed, they being normally opened when the locomotives are connected and conduits 112, 113 and 129 coupled together. It is evident that in Fig. 22 of the drawings only the brake mechanism on one side of each locomotive is illustrated, but it is of course to be understood that the brake mechanism on the other side is connected in parallel.

In the operation of the tandem vehicle arrangement of Figs. 21 and 22 it is manifest that the brakes may be applied on both vehicles while being controlled from either of them. If desired, one of the control valves 32 may be eliminated, in which case the control would be restricted to one of the vehicles. An illustration of this type of system might be where the two vehicles comprised a truck and a trailer or a truck and a series of trailers, there being hydraulic brakes on the truck and the trailer or trailers, all controllable from the operator's cab on the truck. In such a case, only the conduit 113 would have to extend between the several vehicles.

It is of course to be understood that the hydraulic system may be extended to more than two vehicles and the controls may be on one or more of said vehicles, it being simply necessary to continue the system by connecting the control valves 32 in a series.

In Fig. 23 of the drawings I have illustrated a further modification of the hydraulic system which is to be understood as applicable to any of the hydraulic systems indicated. I have here illustrated the pump 59 of the hydraulic system as connected to and driven from the wheels of the vehicle. This arrangement insures the presence of hydraulic fluid under pressure in case of movement of the vehicle and precludes the possibility of a dangerous situation which might arise in case the motor which drives the pump of the hydraulic system becomes inoperative. As here illustrated, the shaft 26 is directly connected to the pump 59 by way of a chain and sprocket drive mechanism 244.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A hydraulic fluid pressure braking system comprising the combination with a hydraulic fluid pump, of a hydraulic fluid pressure accumulator comprising means for storing hydraulic fluid and maintaining it available under pressure, mechanism operable to cause said pump to accumulate said fluid in said accumulator whenever it is operating and said accumulator contains fluid below a predetermined amount therein under pressure and to provide a no-load by-pass for said pump whenever said pump is operating and said accumulator contains said predetermined amount of fluid, operable mechanism, and valve means for controlling a flow of hydraulic fluid from said accumulator to said operable mechanism.

2. In a hydraulic system, the combination with hydraulically operated brake mechanism, of means for supplying hydraulic fluid to said brake mechanism comprising mechanism for supplying hydraulic fluid under pressure, and means to economize in the use of hydraulic fluid supplied thereto from said supplying mechanism comprising an economizer mechanism having a hydraulic fluid output and constructed and arranged to deliver a larger volume of hydraulic fluid to said brake mechanism than is delivered to it by said supplying means until the slack in said brake mechanism is taken up.

3. In a hydraulic fluid pressure braking system, the combination with a source of hydraulic fluid under high pressure, of hydraulically operated braking mechanism, means for operating said braking mechanism by hydraulic fluid from said source comprising mechanism to economize in the use of said hydraulic fluid under high pressure and constructed and arranged to receive hydraulic fluid from said source of hydraulic fluid under high pressure and to deliver hydraulic fluid in a greater volume and lower pressure to said brake mechanism until the slack in said brake mechanism is taken up.

4. In a hydraulic brake system, the combination with a source of hydraulic fluid under high pressure, of brake mechanism, mechanism for operating said brake mechanism by hydraulic fluid from said source while economizing in the use thereof comprising a relatively large diameter cylinder filled with hydraulic fluid under low pressure, conduit means connecting the output of said cylinder to said brake mechanism, a relatively large piston in said cylinder, a smaller cylinder connected to said source of hydraulic fluid under high pressure, piston means therein constructed to actuate said relatively large piston to force hydraulic fluid from said large cylinder to said brake mechanism when actuated thereby taking up the slack in said brake mechanism, and mechanism constructed and arranged to provide for direct application of said hydraulic fluid under high pressure to said large piston after said slack is taken up.

5. In a hydraulic braking system, the combination with a source of hydraulic fluid under pressure, of brake mechanism, mechanism for operating said brake mechanism with fluid from said source comprising an economizer receiving hydraulic fluid from said source of hydraulic fluid under pressure and having means therein constructed and arranged to supply hydraulic fluid to said brake mechanism under pressure below that supplied by the liquid from said source until a predetermined resistance to further movement is created after which hydraulic fluid is supplied to said brake mechanism at a higher pressure.

6. A braking system for vehicles comprising the combination with a hydraulic fluid economizer including a cylinder adapted to receive and discharge hydraulic fluid, of a piston in said cylinder, a small cylinder and piston for moving said first piston, and means constructed and arranged to supply hydraulic fluid to said smaller cylinder and piston to move said first piston until a predetermined resistance to movement is encountered by said first piston after which hydraulic fluid is supplied directly to said first piston to effect further movement thereof.

7. A braking system for vehicles comprising the combination with a hydraulic fluid economizer including a cylinder adapted to contain hydraulic fluid, of a piston therein, front and rear head plates on said cylinder, a fluid outlet in said rear head plate and a fluid inlet in said front head plate, a cylinder having a smaller area than said first mentioned cylinder, piston means in said smaller cylinder operative when actuated to urge said first piston toward said rear head plate, means constructed and arranged to maintain said first cylinder filled with hydraulic fluid on both sides of said first piston, and means constructed and arranged to move said first piston by supplying hydraulic fluid to said second cylinder until a predetermined pressure is realized on the outlet side of said first piston and thereafter supply hydraulic fluid directly to said fluid inlet in said head plate to act directly on said first piston.

8. A braking system for vehicles comprising the combination with a hydraulic fluid economizer including a container, of a piston therein, closures for the opposite ends of said container, mechanism for maintaining said container filled with hydraulic fluid on opposite sides of said piston, a pressure feed pipe leading to one of said closures, and means constructed and arranged to multiply the effective volume of hydraulic fluid to move said piston until a predetermined pressure is present thereon after which the said hydraulic fluid is applied thereto in one-to-one ratio.

9. In a hydraulic braking system, the combination with a source of high pressure hydraulic liquid, of a hydraulic liquid pressure accumulator fed thereby, brake mechanism, valve means for controlling a flow of hydraulic liquid from said accumulator to actuate said brake mechanism, and mechanism interposed between said accumulator and said valve means constructed and arranged to effect a delivery of substantially constant pressure hydraulic liquid to said valve means.

10. A hydraulic pressure accumulator including a cylinder, a piston therein, means biasing said piston toward one end of said cylinder, a feed conduit leading to the other end of said cylinder, and by-pass mechanism in the other end of said cylinder operable to by-pass opening position when said piston is moved against said biasing means a predetermined amount.

11. A braking system for vehicles comprising the combination with a pressure accumulator and regulator including a container, of biased piston means therein, inlet and outlet pipes leading to and from said container, and mechanism constructed and arranged to maintain a substantially constant fluid pressure at said outlet pipe as said inlet pressure varies.

12. A braking system for vehicles comprising the combination with a variable pressure hydraulic fluid control valve, including a casing having an inlet and an outlet for hydraulic fluid with a passageway connecting said inlet and outlet, of a spring pressed piston in said passageway for controlling the fluid flow from said inlet to said outlet, and adjustable means acting through a mechanical connection to said spring pressed piston to control the fluid pressure at said outlet.

13. A braking system for vehicles comprising the combination wtih a hydraulic control valve including a body having a cylindrical bore, fluid inlet, outlet and drain ports leading to said bore, of a control piston adjustable in said bore to regulate the hydraulic fluid flow from said inlet port to said outlet port or to said drain and to shut off said inlet port, one head of said piston being subjected to the pressure at said inlet and the other head thereof being subject to the pressure at said outlet, spring means pushing on said other head, and adjustable operating mechanism for varying the pushing force of said spring means.

14. A braking system for vehicles comprising the combination with a hydraulic control valve including a body having a cylindrical bore, fluid inlet, outlet and drain ports leading to said bore, of a control piston adjustable in said bore to regulate the hydraulic fluid flow from said inlet port to said outlet port or to said drain and to shut off said inlet port, one head of said piston being subjected to the pressure at said inlet and the other head thereof being subject to the pressure at said outlet, spring means pushing on said other head, and another piston in said bore at the oher end of said spring means one end of which is subject to the pressure at said inlet and the other to the pressure at said outlet and operative to counterbalance the forces on said operating mechanism.

15. In a hydraulic braking system for vehicles, the combination with a source of fluid pressure, of hydraulic brake mechanism, a controlling valve, a supply line leading from said source to one end of said valve, a pressure line leading from the other end of said valve to said hydraulic brake mechanism, a plunger, a spring between said plunger and that end of said valve connected to the pressure line, and manually operable mechanism for actuating said plunger to compress said spring to move said valve to closed position to cut off the supply line from a passageway to said pressure line, said manually operable mechanism being movable to selected positions to adjust the tension of said spring for action on said valve against the pressure in the supply line, the construction and arrangement being such that pressure in the pressure line may be varied independently of the pressure in the supply line in accordance with the selected position of the manually operable mechanism, the valve being opened automatically by pressure in the supply line when the tension in the spring is decreased to a certain extent and the valve being automatically closed when the predetermined pressure in the pressure line is reached.

16. In a hydraulic system, the combination with a hydraulic fluid pump, of a hydraulic fluid pressure accumulator comprising means for storing hydraulic fluid and maintaining it available under pressure, a supply pipe for directing liquid from said pump to said accumulator, a check valve in said pipe opening toward said accumulator, and means operable when said accumulator contains a predetermined amount of liquid under pressure to automatically establish a no-load by-pass for the pump while the latter continues to operate.

17. A variable pressure hydraulic fluid control valve mechanism including means affording an inlet and an outlet with a passageway between the same, a ball check valve for controlling the flow of liquid from said inlet along said passageway to said outlet, a spring acting on said check valve tending to close the same, a piston extending into said passageway and engaging said ball check valve, an additional piston spaced from said first-named piston but connected thereto to move therewith, a second spring mounted in a closed chamber between said pistons and acting only on the second-named piston tending to move the first-named piston away from said ball check valve, a third spring mounted to act on the other end of said second-named piston in a chamber communicating directly with said inlet independently of said ball check valve, and means for adjusting the position of the third spring in its chamber to vary the tensions of the second and third springs to such valves as to limit the hydraulic pressure in the passageway between the inlet and outlet, the construction and arrangement being such that when the pressure in said passageway is below said limit the hydraulic pressure from the inlet will effect opening of the check valve but when the pressure in said passageway has been built up to said limit said valve will automatically close whereupon the pressure from the inlet on the check valve will be balanced by the pressure from the inlet on said third piston and resultant spring pressure on the ball valve plus the back pressure thereon holds the same closed.

18. A variable pressure hydraulic fluid control valve mechanism, including means affording an inlet port and an outlet port with a passageway between the same, of a ball check valve for controlling the flow liquid from said inlet port into said passageway, a piston extending into said passageway into engagement with the ball check valve and having a cross-sectional area less than the cross-sectional area of said inlet port, another piston spaced from said first-named piston but connected thereto to move therewith, the cross-sectional area of said second-named piston being equal to the cross-sectional area of said inlet port, means affording a passageway between said inlet port and the chamber of said second-named piston to act on the latter and tend to effect movement of the first-named piston against said ball check valve to close the same, the hydraulic pressure on the ball check valve from the inlet side being counterbalanced by the hydraulic pressure on said second-named piston, a spring acting on that end of said second-named piston opposite to that receiving hydraulic pressure and tending to effect movement of the first-named piston away from said ball valve, an additional spring acting on the hydraulic pressure end of said second-named piston in opposition to the first-named spring, and means for adjusting said second spring to vary the tensions in both so that the resultant pressure of the springs shall be approximately equal to a predetermined pressure in the first-named passage multiplied by the difference between the area of the inlet port and the area of the first-named piston so that the pressure in the first-named passageway may be limited to a predetermined value equal to or below the hydraulic pressure in the inlet and said second-named passageway, said ball check valve being automatically closed when such predetermined pressure in said first-named passageway is reached.

19. A hydraulic control valve including a casing having an inlet and an outlet for hydraulic fluid, a passageway connecting said inlet and outlet, a piston in said passageway for controlling fluid flow from said inlet to said outlet, spring means urging said piston to valve closing position, and manually adjustable means acting directly on said spring means for varying its effective force on said piston.

ROBERT K. JEFFREY.